United States Patent
Gangaraj Manoharan et al.

(10) Patent No.: US 9,148,430 B2
(45) Date of Patent: Sep. 29, 2015

(54) METHOD OF MANAGING USAGE RIGHTS IN A SHARE GROUP OF SERVERS

(75) Inventors: Santosh Kumar Gangaraj Manoharan, Karnataka (IN); Suhas Shivanna, Karnataka (IM)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/001,699

(22) PCT Filed: Aug. 17, 2011

(86) PCT No.: PCT/IN2011/000547
§ 371 (c)(1),
(2), (4) Date: Aug. 27, 2013

(87) PCT Pub. No.: WO2012/164570
PCT Pub. Date: Dec. 6, 2012

(65) Prior Publication Data
US 2013/0340051 A1    Dec. 19, 2013

(30) Foreign Application Priority Data

May 30, 2011 (IN) ............ 1827/CHE/2011

(51) Int. Cl.
| | | |
|---|---|---|
| *G06F 7/04* | (2006.01) | |
| *G06F 15/16* | (2006.01) | |
| *G06F 17/30* | (2006.01) | |
| *H04L 29/06* | (2006.01) | |
| *G06F 21/62* | (2013.01) | |
| *G06F 21/80* | (2013.01) | |
| *H04L 29/08* | (2006.01) | |
| *G06F 9/46* | (2006.01) | |
| *G06F 21/10* | (2013.01) | |

(52) U.S. Cl.
CPC ............... *H04L 63/10* (2013.01); *G06F 9/468* (2013.01); *G06F 21/105* (2013.01); *G06F 21/6218* (2013.01); *G06F 21/805* (2013.01); *H04L 63/104* (2013.01); *H04L 67/1004* (2013.01); *G06F 2221/2141* (2013.01)

(58) Field of Classification Search
CPC ...................................................... H04L 63/10
USPC .................................................................. 726/4
See application file for complete search history.

(56) References Cited

U.S. PATENT DOCUMENTS

| | | | |
|---|---|---|---|
| 6,226,649 B1 | 5/2001 | Bodamer et al. | |
| 6,490,624 B1 | 12/2002 | Sampson et al. | |

(Continued)

FOREIGN PATENT DOCUMENTS

| | | |
|---|---|---|
| CN | 1805332 | 7/2006 |
| CN | 101227315 | 7/2008 |

(Continued)

OTHER PUBLICATIONS

Stanislav Milanovic; Building the Enterprise-Wide Storage Area Network; Year:2001; p. 136-139 vol. 1.*

(Continued)

*Primary Examiner* — Monjour Rahim
(74) *Attorney, Agent, or Firm* — Hewlett-Packard Patent Department (57) ABSTRACT

A share group of servers comprises a first server and a second server. The first server has a server partition and a management processor which is separate from said server partition. Usage rights may be transferred from the first server to the second server by executing machine readable instructions on the management processor which is separate from said server partition.

15 Claims, 6 Drawing Sheets

(56) References Cited

U.S. PATENT DOCUMENTS

| | | |
|---|---|---|
| 7,146,496 B2 | 12/2006 | Circenis et al. |
| 7,373,497 B2 | 5/2008 | Circenis et al. |
| 7,451,183 B2 | 11/2008 | Romero et al. |
| 7,493,488 B2 | 2/2009 | Lewis et al. |
| 7,827,136 B1 * | 11/2010 | Wang et al. .......... 707/610 |
| 8,060,610 B1 | 11/2011 | Herington |
| 8,505,019 B1 | 8/2013 | Blanding et al. |
| 2004/0236852 A1 | 11/2004 | Birkestrand et al. |
| 2008/0065770 A1 | 3/2008 | Romero et al. |
| 2011/0055711 A1 | 3/2011 | Jaquot et al. |

FOREIGN PATENT DOCUMENTS

| | | |
|---|---|---|
| CN | 101317163 | 12/2008 |
| CN | 101655689 | 2/2010 |
| JP | 2002063062 | 2/2002 |

OTHER PUBLICATIONS

"HP-UX 11i Knowledge-on-Demand deployment series—introduction" Hewlett-Packard Development Company, L.P.

International Search Report and Written Opinion, PCT/IN2011/000547, 9 pages.

An Oracle Technical White Paper Best Practices and Guidelines for Depolying the Oracle VM Blade Cluster Reference Configuration, Dec. 1, 2010, http://www.oracle.com/technetwork/articles/systems-hardware-architecture/ovm-blade-ref-conf-192667.pdf.

Oracle VM, Nov. 1, 2009, http://docs.oracle.com/cd/E15458_01/doc.22/e15441.pdf.

European Patent Office, EP Search Report for EP Appl. No. 11866806.0 dated Mar. 30, 2015 (8 pages).

* cited by examiner

| Server | Partition | Active | Inactive | Server Manager Address | Workload |
|---|---|---|---|---|---|
| 1 | 1 | 4 | 2 | 159.25.122 | 100% |
| 1 | 2 | 4 | 2 | 159.25.122 | 85% |
| 1 | 3 | 4 | 2 | 159.25.122 | 85% |
| ... | ... | ... | ... | ... | ... |
| N | 1 | 4 | 2 | 158.20.10 | 20% |
| N | 2 | 4 | 2 | 158.20.10 | 60% |
| N | 3 | 4 | 2 | 158.20.10 | 85% |

*Fig. 4A*

| Server | Partition | No. Usage Rights Owned | Server Manager Address |
|---|---|---|---|
| 1 | 1 | 4 | 159.25.122 |
| 1 | 2 | 4 | 159.25.122 |
| 1 | 3 | 4 | 159.25.122 |

| Server | No. Usage Rights Owned | Server Manager Address |
|---|---|---|
| 2 | 12 | 158.20.10 |
| 3 | 12 | 140.20.10 |

*Fig. 4B*

| Server | Partition | No. Usage Rights Owned | Server Manager Address | Primary Share Group Manager Address |
|---|---|---|---|---|
| 3 | 1 | 4 | 140.20.10 | 159.25.122 |
| 3 | 2 | 4 | 140.20.10 | 159.25.122 |
| 3 | 3 | 4 | 140.20.10 | 159.25.122 |

Fig. 9 ional Application No. PCT/IN2011/000547 filed on Aug. 17,
METHOD OF MANAGING USAGE RIGHTS IN A SHARE GROUP OF SERVERS

CROSS-REFERENCE TO RELATED APPLICATION

The present application is a 371 application of International Application No. PCT/IN2011/000547 filed on Aug. 17, 2011 and entitled "Method of Managing Usage Rights in a Share Group of Servers," which claims benefit of Indian Patent App. No. 1827/CHE/2011 filed on May 30, 2011.

BACKGROUND OF THE INVENTION

Most enterprises today depend upon applications run on servers. These applications often demand high levels of reliability and availability from the servers. Further such applications need to be adaptive to scale up and down according to business needs. Providing extra hardware to give the desired reliability, availability and room for future expansion can prove expensive. One development is to allow customers to purchase systems with inactive hardware resources (processors, memory, cell boards/blades, I/O devices, other hardware devices etc), which can be activated either permanently or temporarily by purchasing usage rights (without which one cannot use the hardware component). When a customer wishes to expand the system or requires more hardware resources, they can simply purchase usage rights for the inactive hardware resources. This enables the customer to spread the cost of purchasing new hardware; they may pay a smaller initial fee for the hardware and then pay for the usage rights as they use them for instance. Further, users may be able to transfer usage rights between server partitions according to demand and, in a recent development, transfer usage rights between servers in different physical locations.

BRIEF DESCRIPTION OF THE DRAWINGS

Some examples are described in the following figures.

DETAILED DESCRIPTION

In this application the term "usage right" is used to mean a usage right for a hardware module (e.g. a processor, processor core, memory, cell board etc). One example of a system which allows users to purchase a server with inactive hardware modules and pay for the usage rights separately (when they are needed) is HP's iCAP (Instant Capacity) product. HP's GiCAP product (Global Instant Capacity) allows usage rights to be transferred between different servers, which may be in different physical locations. Further details of such a GiCAP system are described in U.S. patent Ser. No. 11/518,084 (published as US2008/0065770), which is incorporated herein by reference. HP also has a TiCAP product which allows purchase of temporary usage rights (e.g. to cover times of high load) and may be used with iCAP or GiCAP.

The capability to transfer usage rights between servers has many advantages and for example makes it easier to cope with varying workloads. For instance, imagine a company has two sites in different locations and buys a server for each. The servers are grouped together in a 'share group' such that usage rights can be transferred between them. If the workload on the first server grows rapidly, but the workload on the second server is less than expected, then the company may transfer usage rights from the second server to the first server. In this way the increased workload of the first server may be met without purchasing a replacement server or additional usage rights. Furthermore, transfer of usage rights can be useful for disaster recovery. In the event that a first server is brought down, the usage rights belonging to the first server may be transferred to a second server.

Figure 1:
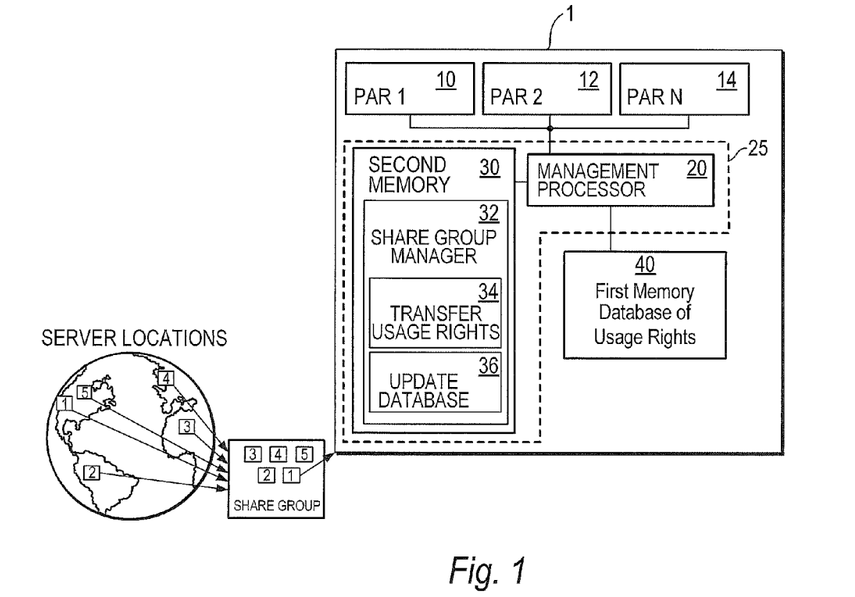
FIG. 1 is a schematic example of a share group of servers, with one of the servers being shown in detail.

FIG. 1 shows a plurality of servers. The servers are grouped together as a 'share group', such that usage rights for hardware modules can be transferred between the servers. In the illustrated example, the share group comprises five servers 1-5, each of which is in a different geographical location. In other examples there could be more or fewer servers and some or all of the servers may be in the same geographical location; however at least some of the servers in the share group are remote from each other in the sense that they are not part of the same server complex and are not housed in the same chassis.

The first server 1 is shown in more detail. It comprises a plurality of server partitions, including a first server partition 10, a second server partition 12 and an Nth server partition 14. Each partition may run its own instance of an operating system and support one or more applications (e.g. business applications which are accessed by client computers over a network). Each partition may correspond to a respective single physical processor or may be supported by a plurality of physical processors; alternatively some or all of the partitions may be virtual partitions supported by the same physical processor or processors.

The server partitions are managed by a server manager 25 which has access to a database of usage rights stored on a first memory. The server manager 25 comprises a management processor 20 and a second memory 30. The second memory 30 stores machine readable instructions executable by the management processor 20 for managing the server partitions. The server manager 25 is typically housed in the same chassis as the processors supporting the server partitions; however the management processor 20 is physically separate from the processor or processors supporting the server partitions 10, 12, 14. Thus, even if the workload of the management processor 20 is increased, it should not seriously impact performance of the server partitions 10, 12, 14 or performance of business applications running on said server partitions.

The second memory 30 stores machine readable instructions which are executable by the management processor 20. In the example of FIG. 1 the machine readable instructions comprise a share group manager module 32. The share group manager module has a 'transfer usage rights sub-module 34' for transferring usage rights between the first server 1 and another server in the share group; and an 'update database sub-module 36' for updating a database 40 when usage rights are transferred between servers. 'Transfer usage rights between the first server 1 and another server' means to transfer usage rights from the first server 1 to another server or to transfer usage rights from another server to the first server 1.

Figure 2:
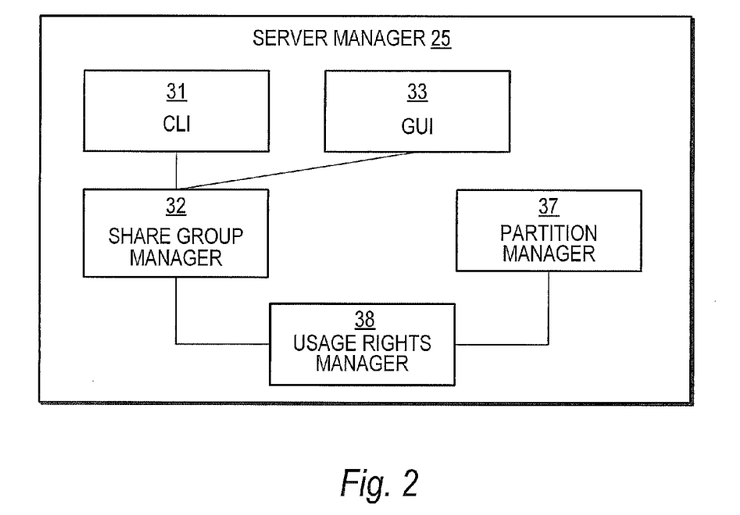
FIG. 2 is a schematic example showing modules of a server manager in detail.

The server manager 25 may provide further functionality for managing the server and in particular the server partitions. The server manager may also be referred to as an Onboard Administrator. FIG. 2 shows one example of further possible modules of the server manager, which may be stored as machine readable instructions in the memory 30 and which are executable by the management processor 20. There is command line interface module 31, a graphic user interface module 33; a partition manager module 37, a usage right manager module 38 and a share group manager module 32. The interface modules provide user interfaces for the system administrator. The partition management module 37 manages the server partitions 10-14 (e.g. power management, defining the partitions, monitoring workload and use of hardware resources, enabling sharing of hardware resources across partitions etc). The usage right management module provides basic support for usage rights management, such as providing or verifying codes to activate or unlock hardware modules of the server partitions. Meanwhile, the share group manager module 32 manages usage rights across servers within the share group and has been described above in FIG. 1. Some or all of these modules may be provided as firmware of the management processor.

A database of usage rights 40 is stored in a first memory which is accessible to the management processor 20. The first memory on which the database is stored is typically within the server chassis. The first memory on which the database 40 is stored and the second memory 30 on which the machine readable instructions are stored may be different parts of the same memory, or may be separate memories as shown in FIG. 1. In one example the first memory on which the database is stored is a Flash Device and the second memory on which the machine readable instructions are stored is a ROM.

Figure 3A:
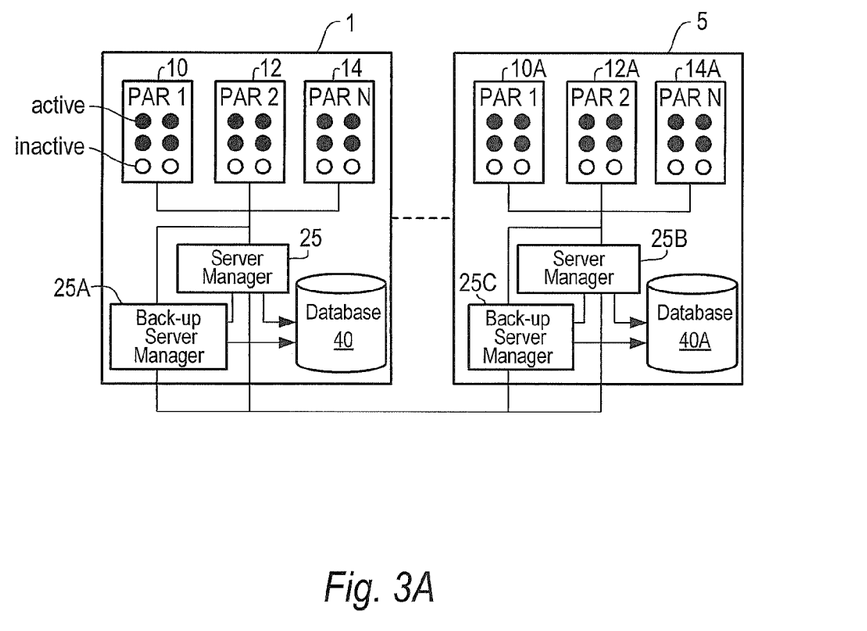
FIG. 3A is a schematic diagram showing the general configuration of two servers in a share group according to one example.
Figure 3B:
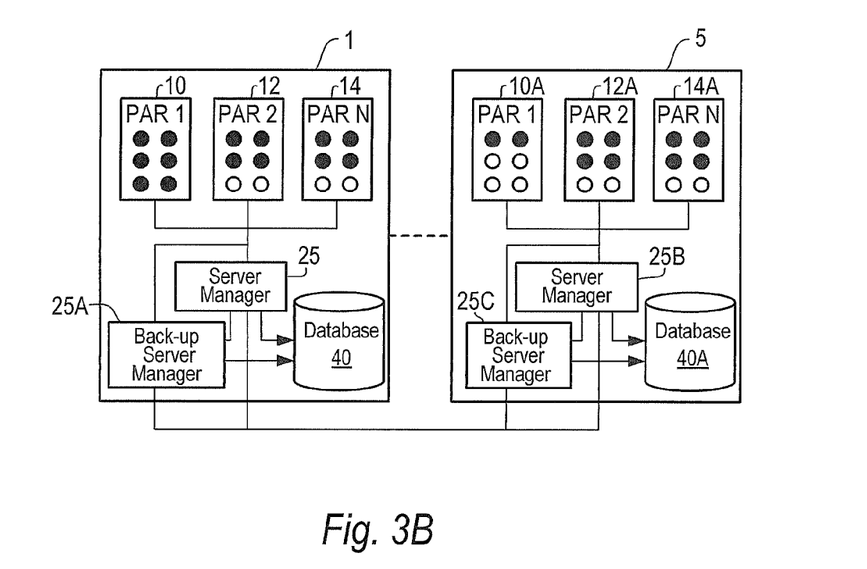
FIG. 3B shows the example of FIG. 3A after usage rights have been transferred between the two servers.

FIGS. 3A and 3B show an example of a share group of servers and transfer of usage rights between the servers. The share group has N servers. Each server has N partitions: 10, 12, 14, a server manager 25, back-up server manager 25A and a usage right database 40. For convenience only the first server 1 and Nth server 5 are shown in FIGS. 3A and 3B. The server partitions of the Nth server are designated with reference numerals 10A, 12A, 14A; while the server manager and back-up server manager of the Nth server are designated with reference numeral 25B and 25C respectively and the usage right database of the Nth server is designated with reference numeral 40A.

Figure 4A:
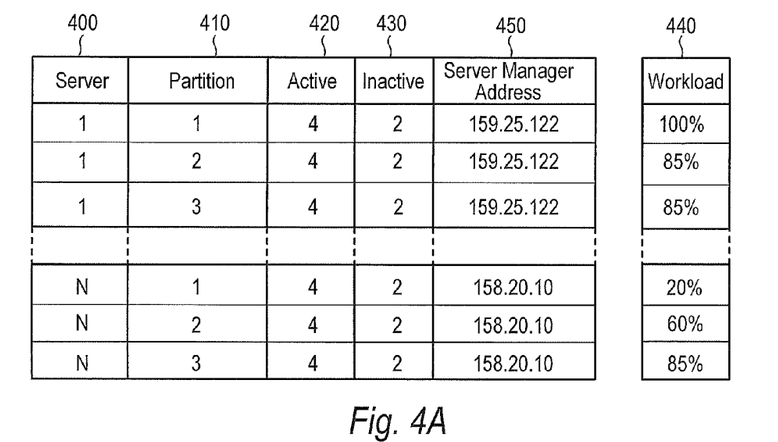
FIG. 4A shows an example of a database storing information about usage rights of a server and information about a share group to which the server belongs.

In FIG. 3A each server partition is supported by a respective multi-core processor. Each core of the processor is a type of 'hardware module' and has an associated usage right. For simplicity, in this example, each processor is the same and is a six core processor. On the first server 1, the first server partition 10 owns usage rights to four of the cores and therefore four cores are active and two cores are inactive (generally a core can be activated only once it is verified that the server partition has the required usage rights). Likewise the second and Nth server partitions 12, 14 also own four usage rights and have four active and two inactive processor cores. The first, second and Nth server partitions 10A, 12A and 14A of the Nth server own usage rights for four cores and so have four active and two inactive cores each. This information is shown in the example usage right database of FIG. 4A. In addition, the database of FIG. 4A shows that the first server partition 10 of the first server has a heavy workload, while the first server partition 10A of the Nth server has a light workload. Therefore, as shown in FIG. 3B, usage rights for two processor cores can be transferred from the Nth server to the first server, e.g. from the first partition 10A of the Nth server to the first partition 10 of the first server. As a result two processor cores are inactivated on partition 10A (leaving only two active cores) and an additional two cores are activated on partition 10. The first partition 10 of the first server is then able to run at full capacity with six processor cores. In other examples usage rights could be transferred from several partitions, e.g. partition 10A and 12B of the Nth server could each loan one usage right to partition 10 of the first server.

As the transfer of usage rights is handled by the server manager 25, which runs on a separate processor to the server partitions 10-14, no server resources are expended in managing usage rights in the share group (in this context a 'server resource' is a resource used to provide server functions to a client, e.g. a processor, memory, or blade etc supporting a server partition). This is in contrast to other solutions which might require an entire server partition or even an entire server to be dedicated to the task of managing the share group and transfer of usage rights. With the approach described in this application, the share group and usage right management may be be carried out without requiring extra servers or server partitions and without impacting the performance of applications running on servers in the share group.

Furthermore, as transfer of usage rights and tracking of usage rights in the share group is handled by the server manager 25, these tasks can be handled in a OS (Operating System) agnostic fashion. By OS agnostic, it is meant that from the perspective of the share group manager module 32, the share group and transfer of usage rights are managed in the same way regardless of the OS of the server partitions. Because of this, different server partitions may have different types of OSes (e.g. Unix and Windows) and it is not a problem to include them in the same share group or transfer usage rights between them as long as the operating system supports dynamic activation/deactivation of resources. Communication with the server partitions can be carried out by the partition management module 37 which may be in firmware of the server manager and the partition management module 37 may communicate with the group manager 32 in an OS agnostic fashion. In contrast, if a server partition (rather than the server manager) was used to manage the share group and communicate directly with the server partitions in the share group, then the set up could be quite complicated and the presence of different OS could cause difficulties. Further, the performance of such a solution would likely not be very high and would be very difficult to implement on a large scale.

FIG. 4A shows an example of a database of usage rights 40. In this example the database has a record for each server partition in the share group. The record lists the ID of the server to which the server partition belongs 400, the server partition ID (e.g. partition number) 410, the number of active hardware modules (i.e. the number of modules for which the server partition has usage rights) 420, the number of inactive hardware modules (i.e. modules for which the server partition does not have usage rights) 430, and the address of the server manager for that server partition 450. In this example the database relates to a single share group and each server partition listed in the database is part of the same share group. Variations are possible, for example the database may not necessarily keep track of the workload of each server partition. In other examples there may be more than one type of hardware module and each type may be entered separately in the database. However, the database comprises at least information relating to usage rights of hardware components of the server on which it is located and information relating to the share group of which that server is a part of (i.e. usage right information of other servers in the share group, or simply an ID of the share group, or the address of another server in the share group).

FIG. 4A also shows the workload 440 of each server partition (e.g. in % form compared to full capacity when all of the partition's active hardware modules are running at full capacity). Thus in the example of FIG. 4A it can be seen that server partition 1 of the first server is at full capacity and it may be helpful to transfer some usage rights from server partition 1 of the Nth server which has spare capacity (running at only 20% workload). The workload information is shown for explanatory purposes only and need not be monitored or stored in the database. However, in other examples the workload may be monitored by the server manager and stored in the database.

Figure 4B:
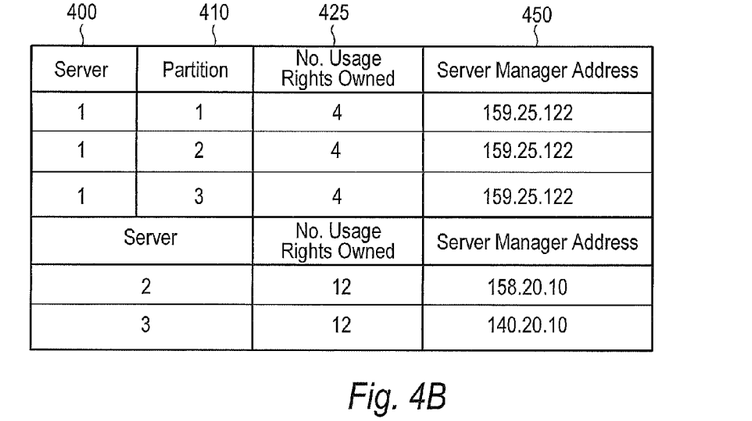
FIG. 4B shows another example of a database storing information about usage rights of a server and information about a share group to which the server belongs.

FIG. 4B shows another example of a usage right database 40 which is similar to FIG. 4A. However, instead of listing the number of active and inactive hardware modules for each server partition it simply lists the number of usage rights belonging to the server partition. Further, rather than providing usage right information for each server partition in the share group, the database stores usage right information for each server partition of the local server (e.g. the server on which the database is located) and the total usage rights belonging to other servers in the share group (not broken down by server partition).

Figure 4C:
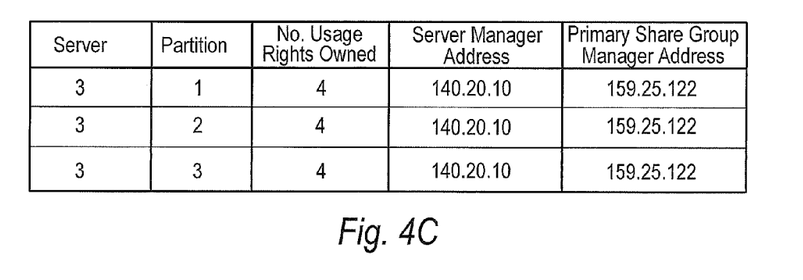
FIG. 4C shows another example of a database storing information about usage rights of a server and information about a share group to which the server belongs.

FIG. 4C shows another example of a usage right database which stores usage rights belonging to each server of the local server and the address of the primary share group manager of the share group to which the server belongs.

The management of usage rights in the share group will now be described in more detail. It may be carried out in a centralized fashion or in a federated fashion. If the management of usage rights is centralized then the server managers is designated as the primary share group manager which coordinates allocation of usage rights and transfer of usage rights between servers, while the other server managers are designated as secondary share group managers which manage usage rights locally on their servers. If the management is federated then any of the server managers may act as a primary share group manager and coordinate transfer of usage rights between servers.

Figure 5:
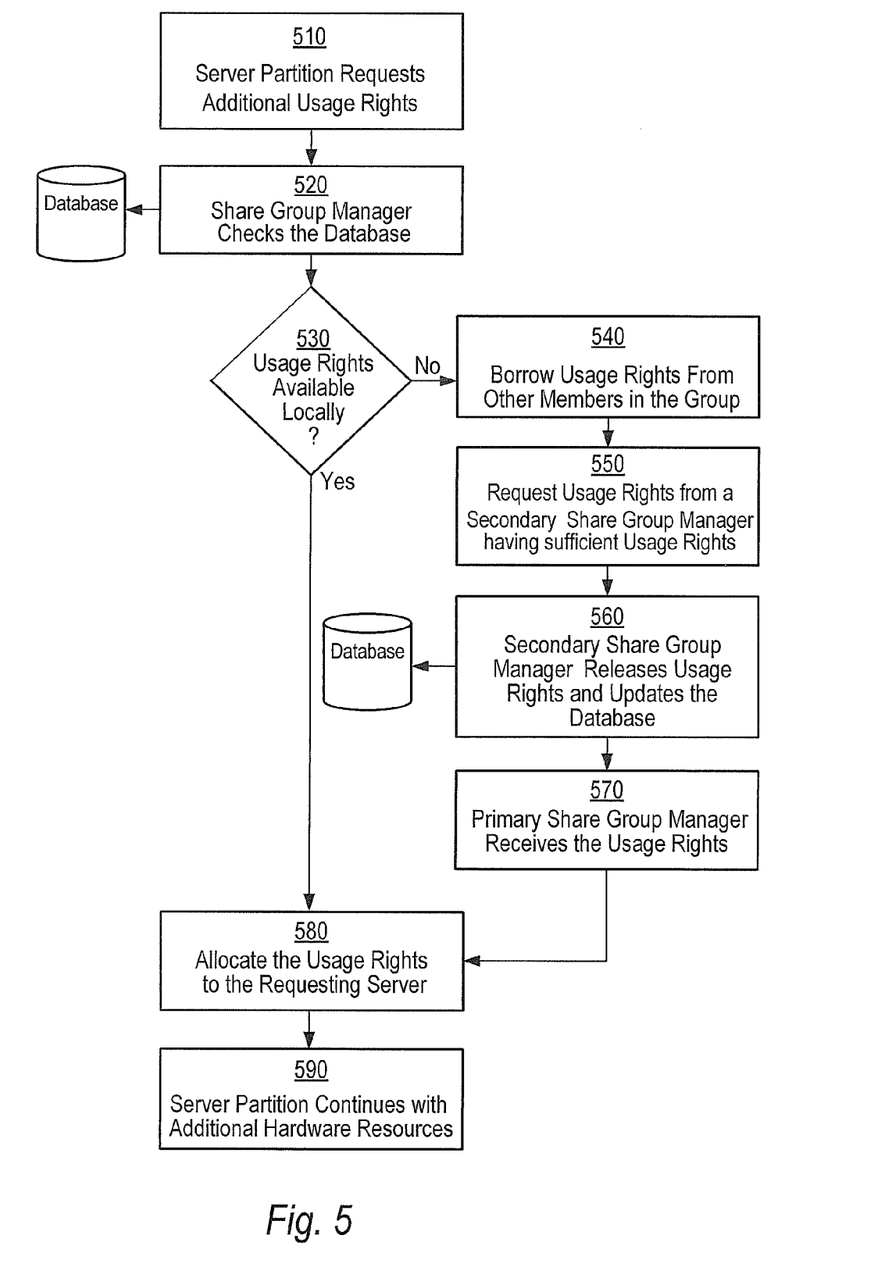
FIG. 5 is a flow chart showing an example of a method of transferring usage rights in a share group.

FIG. 5 is a flow chart showing one example of a method of transferring usage rights between servers in a share group. At 510 additional usage rights are requested for a server partition ('the requesting server partition') of a server (the 'requesting server'). The request may be made by an application running on the requesting server partition, a system administrator, or by the partition management module of the requesting server. Typically the request may be made in response to increased or high workload experienced by the requesting server partition. The request is directed to the requesting server's share group manager.

At 520 the share group manager of the requesting server consults the usage right database 40 of the requesting server and (530) determines if usage rights are available locally on the requesting server. If usage rights are available locally then the usage rights are allocated to the requesting server partition at 580 by loaning usage rights locally within the requesting server, e.g. by transferring usage rights internally from one server partition to another (e.g. from first partition 10 to second partition 12 in FIG. 3A).

If no usage rights are available locally (e.g. because all processor cores are running at full capacity), then it is necessary to borrow usage rights from another server in the share group (540). If a federated solution for transferring usage rights is used, then the share group manager of the requesting server designates itself as the primary share group manager and the share group managers of other servers are treated as secondary share group managers. If a centralized solution is used then one of the share group managers has already been designated as the primary share group manager and all of the other share group managers are designated as secondary share group managers. In the centralized case, the share group manager of the requesting server contacts the primary share group manager with the request for usage rights (unless the share group manager of the requesting server is itself the primary share group manager).

At 550 the primary share group manager selects a server ('the donor server') from which to borrow usage rights on the basis of the information in its usage rights database 40. The donor server is a server which has sufficient usage rights and may be a server which currently has a lower workload. It is possible for one, two or more donor servers to be selected. The primary share group manager then contacts the secondary share group manager of the donor server to request the usage rights. Once the secondary share group manager of the donor server confirms the usage rights can be loaned, the usage rights are transferred at 560. Specifically the secondary share group manager of the donor server inactivates a hardware module corresponding to the requested usage right. The usage rights database 40 of the primary share group manager is updated to reflect the transfer. At 570 the share group manager of the requesting server receives the usage right. At 580 the share group manager of the requesting server allocates the usage right to the requesting server partition by activating a corresponding hardware module on the requesting server partition. The requesting server partition now continues operating with the benefit of the additional hardware resources (590).

In the federated approach all of the usage rights databases in the share group need to be updated to reflect the transfer of usage rights. In the centralized approach only the usage rights databases which store data relating to the transferred usage rights need to be updated (which may be all of the databases or just some of the databases).

Both of the example databases shown in FIGS. 4A and 4B would need to be updated as they contain information relating to usage rights of each server in the share group. However, the example database show in FIG. 4C would not need to be updated unless the server to which it belongs (server 3) was the requesting or donor server. The database shown in FIG. 4C is sufficient for a database accessed by a secondary share group manager in the centralized approach, as it has usage rights belonging to its server and information relating to the share group to which it belongs (in this case the address of the primary group manager of the share group). However the database of FIG. 4C is not suitable for a primary share group manager, or in the federated approach, as it does not store information relating to usage rights of other servers. The examples in FIG. 4A and FIG. 4B are suitable databases for use with either a primary share group manager or a secondary share group manager in both centralized and federated approaches.

Figure 9:
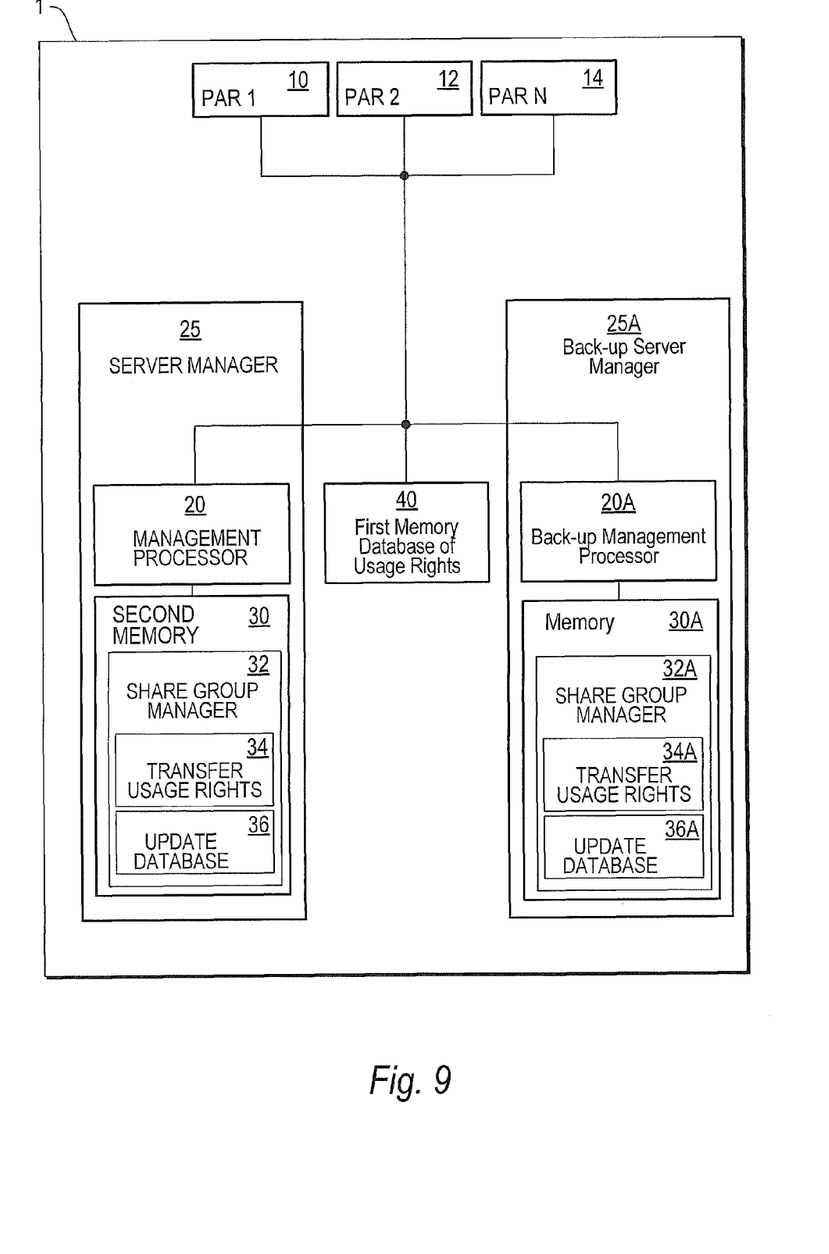
FIG. 9 shows one of the servers of FIG. 3A in detail

Referring again to FIG. 3A, it can be seen that each server has a server manager and a back-up server manager. FIG. 9 shows a more detailed example of the server manager and back-up server manager for the first server 1 (the other servers may have similar configurations). The back-up server manager comprises a back-up management processor 20A which has access to a memory 30A storing machine readable instructions for managing the server and usage rights. The memory 30A may have the same modules as shown in FIGS. 1 and 2. The database 40 is on a shared storage which is accessible to both the server manager 25 and the back-up server manager 25A. Thus when the server manager 25 fails the back-up server manager 25A may take over. In FIG. 9 the server manager 25 and back-up server manager 25A each have their own separate memories 30, 30A for storing machine readable instructions. In other examples the management processor and back-up management processor may read and execute machine readable instructions held in a shared memory, e.g. the memory storing the database 40 or another shared memory.

Figure 6:
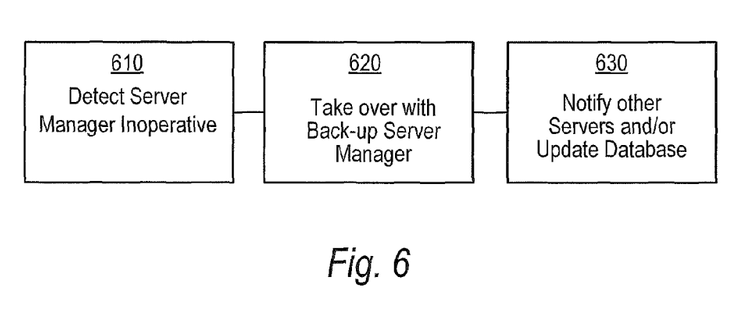
FIG. 6 is a flow chart showing an example method of transferring control to a back-up server manager if the primary server manager fails.

FIG. 6 is a flow chart showing an example method for taking over the server manager 25 with the back-up server manager 25A, when the server manager 25 has failed. At 610 the back-up server manager 25A detects that the server manager 25 is inoperative (i.e. has failed). At 620 the back-up server manager 25A takes over from the server manager 25, e.g. it takes over the server management, usage right and share group management functions etc. At 630 the back-up server manager 25A notifies the other servers in the share group that it has taken over from the failed server manager 25 and updates the usage right database 40 to record itself as the server manager, e.g. by writing its IP address and/or hostname to the database as the contact details of the server manager for that server. The example method of FIG. 6 may be stored as machine readable instructions on a memory which is readable by the back-up management processor (e.g. memory 30A).

The failure recovery process is very simple because both the server manager 25 and the back-up server manager 25A have access to the same usage right database. Therefore no or minimal re-configuration is needed for the back-up server manager to take over the group management functions. Further, as the server managers on each server can take care of activating and deactivating hardware modules on the server partitions when usage rights are transferred, the back-up server manager does not need to communicate directly with multiple server partitions of different servers (possibly having different OS), but can simply communicate with its usage right database and the server managers of each server in order to track and/or transfer usage rights.

In the federated approach to managing usage rights in the share group, the share group can continue operating even if one of the servers in the group fails, as each server manager is capable of acting as a primary share group manager for coordinating transfer of usage rights. However, in the centralized approach one server is designated as the server having the primary share group manager and when server managers of other servers wish to transfer rights between servers they communicate with the primary share group manager. Thus in the centralized approach there is a problem if the server containing the primary share group manager fails (e.g. if both the primary and back-up management processors of that server fail).

Figure 7:
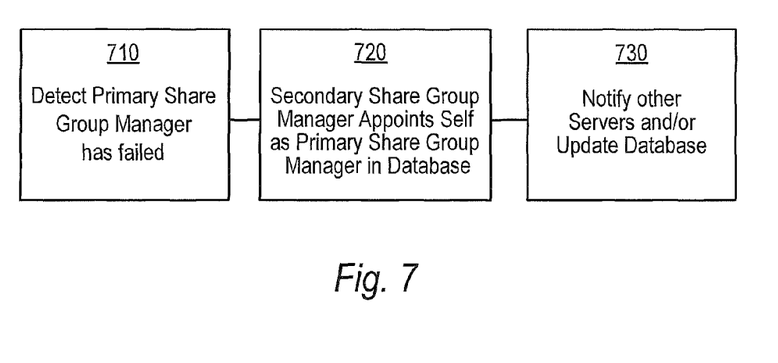
FIG. 7 is a flow chart showing an example method of a secondary group manager taking control if the primary group manager fails in the centralized approach to management of usage rights in a share group.
Figure 8:
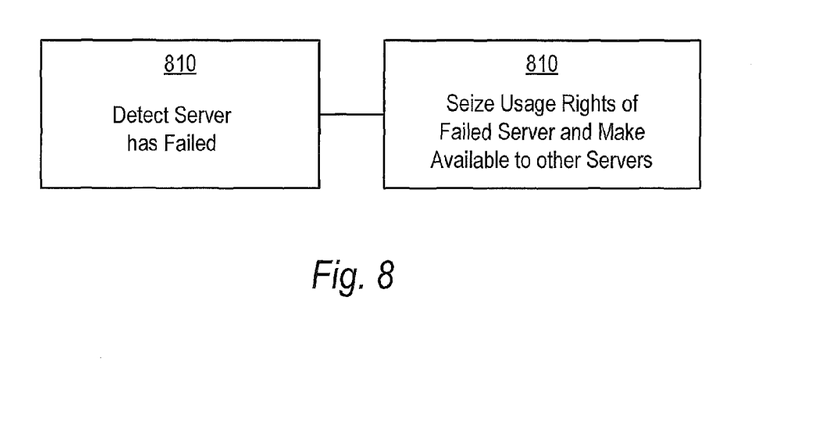
FIG. 8 is a flow chart showing an example method of a server seizing resources belonging to a failed server in a share group.

Therefore as a back-up mechanism, if the share group employs a centralized approach and if the primary share group manager fails, then one of the secondary share group managers (housed on one of the other servers in the share group) can take over as the new primary share group manager. An example of this process is illustrated in FIG. 7. At 710 the secondary share group manager (e.g. server manager 25B of server 5 in FIG. 3A) detects, or is informed, that the primary share group manager has failed (e.g. this might happen if both server manager 25 and back-up manager 25A of server 1 fail). At 720 the secondary share group manager updates the usage right database 40A on its server to designate itself as primary share group manager for the share group. It also communicates this to other servers in the share group, e.g. by sending an instruction to update the usage right databases on other servers in the share group to indicate that it is the new primary share group manager. The secondary share group manager may already have complete details of the usage rights of all servers in the share group in its usage right database 40A. For example, there may be a process or mechanism in the machine readable instructions to sync the usage database 40A of the secondary share group manager with the usage right database 40 of the primary share group manager, e.g. to synch after every update, or periodically. In other cases, such a mechanism may not be in place, or for whatever reason, the secondary share group manager database 40A may not have usage right information relating to all the other servers in the share group. If such information is lacking, then the secondary share group manager 25B replicates or copies some or all of the contents of the usage right database 40 of the previous share group manager to its own database 40A. At 730 the secondary share group manager takes over the share group management functions of the primary group manager, e.g. by receiving requests to transfer rights from other servers and selecting appropriate donor servers If a server fails, e.g. becomes inoperative, then usage rights belonging to its server partitions are tied up to that server but are no longer actively used. To prevent wastage of usage rights, another server may seize the usage rights as its own. An example of this process is shown in FIG. 8. At 810 a share group manager of a first server detects that one of the other servers in the group is inoperative. At 820 the share group manager seizes the usage rights from the inoperative server and allocates them to other servers and updates it usage right database accordingly. Usage right databases of other servers in the system are updated to reflect the change in ownership of usage rights as appropriate.

The primary share group manager (or any share group manager in the federated approach) may also add new servers or server partitions to the share group by simply updating the user right database to contain information relating to the new server or server partitions and their usage rights. In the same way servers or server partitions can be removed from the share group. The update may be propagated to the usage right databases (on the other servers) periodically or at the time when the change is made. These processes and those described above in FIGS. 6 to 8 may be stored as machine readable instructions on a memory of the server and executed by the management processor of the server.

The term processor includes microprocessors, microcontrollers, processor modules or subsystems (including one or more microprocessors or microcontrollers), or other control or computing devices. A "processor" can refer to a single component or to plural components.

In some examples one or more blocks or processes discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

In some examples, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Such computer-readable or computer-usable storage medium or media is (are) considered to be part of an article (or article of manufacture). An article or article of manufacture can refer to any manufactured single component or multiple components.

What is claimed is:

1. A first server comprising:
a server partition provided by a first processor;
a management processor for managing said server partition, said management processor being separate from said first processor;
a first memory accessible to said management processor; said first memory storing a database of usage rights which comprises information relating to a share group to which said first server belongs and usage rights belonging to said first server; each of the usage rights belonging to said first server being a right to use a particular type of hardware module; said share group comprising at least said first server and a second server remote from said first server;
a second memory accessible to said management processor, said second memory storing machine readable instructions executable by said management processor to transfer at least one of the usage rights between said first server and another server in the share group and update said database accordingly.

2. The server of claim 1 wherein said database stored in the first memory comprises information relating to usage rights belonging to each server in said share group.

3. The server of claim 1 wherein said second memory stores machine readable instructions executable by said management processor to replicate said database in memories of other servers in said share group.

4. The server of claim 1 wherein said first server further comprises a back-up management processor separate from said first processor and said management processor, said database stored on said first memory being accessible to said back-up management processor; and wherein said first server has a memory storing machine readable instructions executable by said back-up management processor to detect when said management processor has failed and to automatically take over from said management processor when said management processor has failed.

5. The server of claim 1 wherein said second memory stores machine readable instructions executable by said management processor to add a new server to said share group of servers and update said database to include said new server.

6. The server of claim 1 wherein said second memory stores machine readable instructions executable by said management processor to receive a request for usage rights from another server in said share group, transfer said usage rights to said other server and update said database accordingly.

7. The server of claim 1 wherein said second memory stores machine readable instructions executable by said management processor to determine that a partition of said first server requires more hardware resources, check if sufficient usage rights for said hardware resources belong to said first server and if not then send a request to a management processor of a second server in said share group to transfer some of said second server's usage rights to said partition of said first server and update said database in said first memory of said first server accordingly.

8. The server of claim 1 wherein said second memory stores machine readable instructions executable by said management processor to transfer usage rights from a second server to another server in said share group when it is determined that said second server is inoperative.

9. The server of claim 1 wherein said first memory and said second memory are separate memories and wherein said machine readable instructions are firmware of said management processor.

10. A share group of servers comprising:
a first server having a first plurality of server partitions and a first server manager separate from said first plurality of server partitions;
a second server remote from said first server, said second server having a second plurality of server partitions and a second server manager separate from said second plurality of server partitions;
said first server having a first memory accessible to said first server manager; said first memory storing a first database of usage rights comprising information relating to usage rights belonging to said first and second servers; each of the usage rights being a right to use a particular type of hardware module;
said second server having a memory storing a second database of usage rights comprising information relating to usage rights belonging to said second server;
and wherein said first server has a second memory storing machine readable instructions executable by a processor of said first server manager to allocate the usage rights stored in the first and second databases to servers in said share group, track changes to ownership of the allocated usage rights within said share group and update said first database in said first memory accordingly.

11. The server of claim 10 wherein at least one partition on the second server has a different operating system to at least one partition on the first server.

12. The server of claim 10 wherein said second memory stores machine readable instructions executable by said first server manager to replicate the contents of said first database in said second database of said second server.

13. The server of claim 10 wherein said first server manager is designated as a primary share group manager and wherein said second memory comprises instructions for selecting which server in said share group to borrow usage rights from when one of the servers in the share group requires additional usage rights.

14. The server of claim 13 wherein said second server manager of said second server is able to detect when said first server manager is inoperative and upon detecting that said first server manager is inoperative, automatically takes over as the primary share group manager and notifies the server managers of other servers in the share group that it is the primary share group manager.

15. A method of managing usage rights in a share group of servers comprising a first server and a second server remote from the first server; said first server comprising plural server partitions, a first management processor separate from said plural server partitions and a memory; the method comprising using said first management processor to execute machine readable instructions stored in said memory to:
- a) determine that a server partition of said first server needs additional hardware resources;
- b) check if sufficient usage rights for the additional hardware resources are available on said first server;
- c) if said first server does not have sufficient usage rights then borrow usage rights from said second server; and
- d) update a usage right database to reflect transfer of ownership of said borrowed usage rights from the second server to the first server;

wherein processes a) to d) are executed by said first management processor and do not use processor resources allocated to server partitions of said first and second servers.

* * * * *